June 18, 1957 D. A. JENNY 2,796,368

METHOD OF MAKING SEMI-CONDUCTOR DEVICES

Filed Nov. 23, 1953

INVENTOR.
Dietrich A. Jenny

BY J. L. Whittaker

ATTORNEY

United States Patent Office 2,796,368

Patented June 18, 1957

2,796,368

METHOD OF MAKING SEMI-CONDUCTOR DEVICES

Dietrich A. Jenny, Princeton, N. J., assignor to Radio Corporation of America, a corporation of Delaware Application November 23, 1953, Serial No. 393,593

5 Claims. (Cl. 148—1.5)

This invention relates to improved semi-conductor devices and methods of making them. More particularly the invention relates to improved methods of treating alloy pellets that are used to form electrodes of junction type semi-conductor devices.

It is known to make a semi-conductor device comprising a body of crystalline semi-conductive material such as germanium or silicon having one or more p-n rectifying barriers or junctions disposed within the body. One method of making such devices is known as the alloy-diffusion process or, more simply, as the alloy process. In this process a relatively small body or pellet of a conductivity type-determining impurity-yielding material is alloyed to the surface of a semi-conductive wafer. The impurity-yielding material is selected to yield impurities of a type opposite to the conductivity type of the semi-conductive wafer.

N-type impurity-yielding materials for germanium or silicon include the elements of the nitrogen group of the periodic table. Antimony has been frequently used as an alloying impurity in a pellet in the alloy process. It has also been found desirable to form pellets that are to be alloyed to a p-type semi-conductive material not of antimony alone, but of antimony alloyed with an inert material such as lead which does not affect the conductivity type of the semi-conductive material. Use of lead as a carrier or solvent for the significant impurity-yielding material has been found advantageous because lead minimizes thermal strains that may arise between the semi-conductive body and an electrode formed by the alloy process. Difficulty is encountered, however, in fusing lead-containing pellets to semi-conductive surfaces. Such pellets apparently do not readily and evenly wet a semi-conductive surface and they tend to produce non-uniform rectifying barriers within wafers to which they are alloyed. Many such devices exhibit erratic electrical performance and relatively low commercial production yields.

Accordingly, it is an object of the instant invention to provide an improved method of making semi-conductor devices.

Another object is to provide an improved method of making semi-conductor devices including p-type semi-conductive material and a junction-forming electrode composed of an alloy of lead fused to said material.

Another object is to provide improved methods of treating lead alloy pellets in preparation for alloying said pellets to semi-conductive bodies.

Still another object is to provide improved lead alloy pellets suitable for use in making semi-conductor devices of the alloy junction type.

These and other objects may be accomplished in accordance with the instant invention which provides improved alloying of a lead-bearing body to a semi-conductive body. Lead alloy pellets are treated according to the invention by etching them in a chemical etching solution composed of acetic acid and hydrogen peroxide.

This etching solution affects the surface of the pellets so that when heated the pellets more readily and more evenly wet and alloy with the surface of a semi-conductor body.

The invention will be described in greater detail with reference to the drawing of which:

Similar reference characters are applied to similar elements throughout the drawing.

A semi-conductor device including a p-n rectifying junction in a body of p-type semi-conductive germanium according to a preferred embodiment of the invention ultilizes an electrode-forming pellet consisting of about 10% antimony and 90% lead by weight. The proportions of lead and antimony in this material are not closely critical and may be varied within relatively wide limits from about 2% to about 50% antimony. It is preferred, however, for reasons of convenience in melting and to insure a relatively high degree of ductility in the electrode which is formed, to make the pellet of a lead-antimony alloy having a composition close to the eutectic. The eutectic alloy comprises about 11.2% antimony and 88.8% lead by weight.

The pellet is immersed for at least a few seconds in a solution consisting of about three parts glacial acetic acid and one part by volume hydrogen peroxide (30%). The acetic acid-peroxide solution cleans the surface of the pellet and removes substantially all significant impurities therefrom. Although hydrogen peroxide is an oxidizing agent, it is effective in combination with acetic acid to remove any film or particles of lead oxide and antimony oxide that may be initially on the surface of the pellet.

Figure 1:
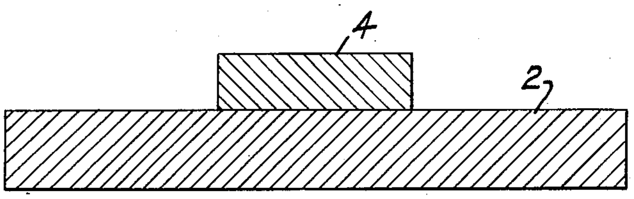
Figure 1 is a schematic, elevational, cross-sectional view of a pellet and a semi-conductive wafer preparatory to an alloy process.

As shown in Figure 1 the pellet 4 is placed upon the surface of a wafer 2 of semi-conductive germanium. The sizes of the pellet and the wafer are not critical in the practice of the invention. The pellet conveniently may be in the form of a disc about .045" in diameter and about .015" thick. The wafer may conveniently be about 1/8" square and .003"–.010" thick. The bodies are heated together at about 650° C. for about ten minutes in a non-oxidizing atmosphere such as may be provided by a flow of dry and de-oxidized hydrogen to fuse and to alloy the pellet to the wafer to form the device shown in Figure 2. The device is cooled to room temperature slowly at an average rate of cooling not in excess of about 40° C. per minute.

Figure 2:
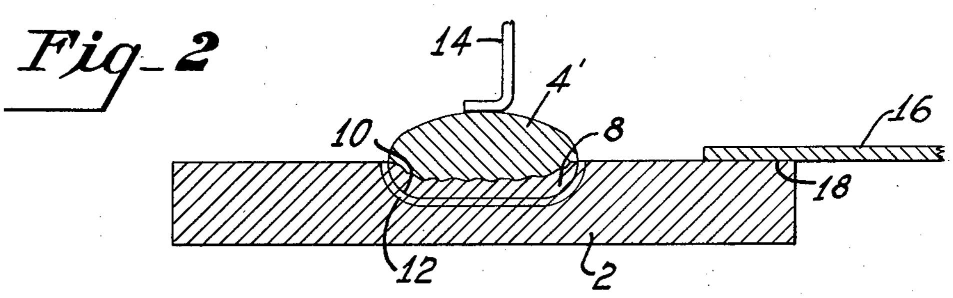
Figure 2 is a schematic, elevational, cross-sectional view of a device produced according to the invention.

The device thus produced as shown in Figure 2 comprises the germanium wafer 2 to which there is alloyed the electrode 4' formed from the pellet 4 of Figure 1. During heating a portion of the material of the wafer is dissolved into the pellet and during cooling a portion of this dissolved material recrystallizes upon the wafer to form the recrystallized region 8. The maximum point of penetration of the pellet material during the alloying process is called the alloy front and is shown by the line 10. A p-n rectifying junction 12 is formed adjacent the alloy front.

Electrical leads 14 and 16 may be attached to the electrode and to the wafer respectively to incorporate the device in a circuit, and the device may be conventionally etched, mounted and potted.

The practice of the instant invention is also advantageous in treating pellets of lead alloys which include other impurity-yielding materials than antimony. For example, the other elements of the nitrogen group are known to yield n-type impurities when dispersed in semi-conductive germanium. Alloys of lead with bismuth, arsenic or phosphorus may all be used as electrode-forming pellets to produce semi-conductor junction devices with p-type semi-conductive germanium. Also, alloys of lead with metals such as indium and gallium may be used as electrode-forming pellets to produce junction devices with n-type semi-conductive germanium.

The instant invention provides an improved procedure that may be advantageously used to prepare pellets that include any of these materials. Broadly, an etching method according to the invention is advantageous to prepare alloy pellets comprising at least about 50 wgt. percent of lead for surface alloying to semi-conductive germanium.

The composition of the etching solution may be varied within relatively wide limits without detracting substantially from the beneficial effects provided. In general any solution consisting essentially of, by volume, 50% to 90% glacial acetic acid, 10% to 50% of a 30% hydrogen peroxide solution and the balance water, operates satisfactorily to prepare lead alloy pellets according to the invention. Solutions in the upper concentration range, especially with regard to hydrogen peroxide, are preferred since they operate relatively more rapidly than more dilute solutions.

What is claimed is:

1. A method of making a semi-conductor device comprising a body of semi-conductive germanium having an electrode consisting of an alloy of lead fused to a surface thereof, at least two regions of reciprocally opposite conductivity types within said body adjacent said electrode, and a p-n rectifying junction intermediate said regions, said method comprising the steps of immersing a body of an alloy of lead and a conductivity type-determining impurity-yielding material of one conductivity type in an aqueous solution of acetic acid and hydrogen peroxide and thereafter alloying said lead alloy body into a surface of a semi-conductive germanium body of a conductivity type opposite to said one conductivity type, thereby to form said device.

2. The method according to claim 1 in which said lead alloy body comprises about 90% lead and 10% antimony, and said semi-conductive germanium has p-type conductivity.

3. The method according to claim 1 in which said lead alloy body includes at least about 50% lead.

4. The method according to claim 1 in which said solution comprises by volume 50% to 90% acetic acid, 10% to 50% of 30% hydrogen peroxide solution and the balance water.

5. The method according to claim 1 in which said solution comprises by volume about 3 parts glacial acetic acid and 1 part 30% hydrogen peroxide solution.

References Cited in the file of this patent

UNITED STATES PATENTS 2,689,785 Simon ---------------- Sept. 21, 1954